(12) United States Patent
Morioka et al.

(10) Patent No.: US 7,801,401 B2
(45) Date of Patent: Sep. 21, 2010

(54) OPTICAL ELEMENT, OPTICAL MODULE, OPTICAL CONNECTOR, AND OPTICAL MODULE MANUFACTURING METHOD

(75) Inventors: Shimpei Morioka, Kawaguchi (JP); Tomohiro Shimoguchi, Kawaguchi (JP)

(73) Assignee: Enplas Corporation, Saitama (JP)

( * ) Notice: Subject to any disclaimer, the term of this patent is extended or adjusted under 35 U.S.C. 154(b) by 376 days.

(21) Appl. No.: 11/900,152

(22) Filed: Sep. 10, 2007

(65) Prior Publication Data
US 2008/0088929 A1   Apr. 17, 2008

(30) Foreign Application Priority Data
Sep. 11, 2006  (JP) .............................. 2006-245634

(51) Int. Cl.
*G02B 6/34* (2006.01)
(52) U.S. Cl. .......................................... 385/37; 385/92
(58) Field of Classification Search ................. 359/566, 359/569, 571; 385/37, 39, 40, 88, 92, 93; 250/227.17

See application file for complete search history.

(56) References Cited

U.S. PATENT DOCUMENTS 6,125,092 A * 9/2000 Takei et al. ............. 369/112.04

FOREIGN PATENT DOCUMENTS

| JP | 04-100012 | 4/1992 |
|---|---|---|
| JP | 05-207384 | 8/1993 |
| JP | 2004-294636 | 10/2004 |

* cited by examiner

*Primary Examiner*—Alessandro Amari
(74) *Attorney, Agent, or Firm*—H. Henry Koda; William L. Androlia

(57) ABSTRACT

It is to provide an optical element, an optical module, an optical connector, and an optical module manufacturing method that can quickly and very accurately control the amount of outgoing light to a desired amount when incident light is outputted, reduce costs, and enhance manufacturing efficiency.

A diffraction grating 9 having a periodic structure made from a plurality of grating grooves 10 and formed to allow control of an amount of outgoing light using polarization-dependent characteristics when incident light is outputted as the outgoing light and a mark 11 indicating at least one of either a grating groove 10 direction of the diffraction grating 9 or a periodic direction of the diffraction grating 9 are included.

8 Claims, 17 Drawing Sheets

OPTICAL ELEMENT, OPTICAL MODULE, OPTICAL CONNECTOR, AND OPTICAL MODULE MANUFACTURING METHOD

BACKGROUND OF THE INVENTION

1. Field of the Invention

The present invention relates to an optical element, an optical module, an optical connector, and an optical module manufacturing method. In particular, the present invention relates to an optical element, an optical module, an optical connector, and an optical module manufacturing method that are suitable for controlling an amount of outgoing light when incident light is outputted.

2. Description of the Related Art

Conventionally, a polarizer, a diffraction grating, and the like are known as an optical element having a function for controlling an amount of outgoing light to a desired amount of light, when incident light is outputted by transmission or the like.

Regarding an optical element such as this, the present applicants and others have proposed an invention that is an optical module used in optical communication, in Japanese Patent Application No. 2003-84965. In the optical module, a diffraction grating is disposed between an optical fiber and a photoelectric conversion element. A holder, a lens, and the diffraction grating are integrally formed from resin material.

Conventional technologies, such as those described in Patent Literatures 1 and 2, have been disclosed regarding this type of optical element.

Patent Literatures 1 and 2 disclose adjustment of an amount of light to be used. The adjustment is made by a component, such as a polarizer, being rotated.

Other than those described in Patent Literatures 1 and 2, there is a technology in which laser outputted from a transmitter optical sub-assembly (TOSA) of an optical front-end (OFE), used in fiber optic communication, is adjusted. Specifically, in the technology, filters and materials having various transmittances are prepared, and transmittance of a laser beam is adjusted. As a result, the intensity of the laser being incident on an optical fiber is weakened. In a technology such as this, for example, the light incident on an optical element can be weakened and outputted, for example, every one to five percent.

[Patent Literature 1] Japanese Patent Unexamined Publication No. Heisei 5-207384

[Patent Literature 2] Japanese Patent Unexamined Publication No. Heisei 4-100012

However, the conventional technologies disclosed in Patent Literatures 1 and 2 have problems such as those described below.

In other words, a polarizing plate stop device described in Patent Literature 1 uses two polarizing plates and adjusts the amount of light by making the polarization directions of the two polarizing plates intersect with each other. As a result, costs increase because two polarizing plates are used. In addition, the assembly process becomes complex because the amount of light is required to be adjusted for each of the two polarizing plates.

An optical module described in Patent Literature 2 provides light output that is adjusted to a desired level by a deflector being rotated around an optical axis. Stability against disturbances caused by temperature fluctuations and the like can be achieved. However, there is no indicator regarding the amount by which the deflector is rotated. As a result, the light output cannot be adjusted quickly during the manufacturing process, and assembly efficiency is poor.

Furthermore, even when the amount of light is adjusted using the filter and the like described above, the problem of increased costs caused by the filter and the like being required cannot be avoided.

SUMMARY OF THE INVENTION

The present invention has been achieved in light of the above-described problems. An object of the invention is to provide an optical element, an optical module, an optical connector, and an optical module manufacturing method that can quickly and very accurately control the amount of outgoing light to a desired amount when incident light is outputted, reduce costs, and enhance manufacturing efficiency.

In order to achieve the aforementioned object, an optical element according to a first aspect of the present invention is an optical element comprising a diffraction grating and a mark. The diffraction grating has a periodic structure made from a plurality of grating grooves and is formed to allow control of the amount of outgoing light using polarization-dependent characteristics when incident light is outputted as the outgoing light. The mark indicates at least one of a grating groove direction of the diffraction grating and a periodic direction of the diffraction grating.

In the first aspect of the invention, the amount of outgoing light from the diffraction grating can be controlled using the polarization-dependent characteristics of the diffraction grating having a simple structure. In addition, when at least one of either an optical element or a photonic element is rotated and adjusted to a position at which the amount of outgoing light is the desired amount of light, the rotation and adjustment can be easily and quickly performed through use of the mark. As a result, costs can be reduced, and manufacturing efficiency of an optical product using the diffraction grating having a light amount adjustment function can be enhanced.

An optical element according to a second aspect is the optical element according to the first aspect, wherein, a photonic element that can perform at least one of either light emission or light reception can be fixed. When the photonic element is fixed, the optical element is formed to be fixed to the photonic element after at least one of either an optical element main body or the photonic element is rotated around the optical axis and adjusted so that the amount of outgoing light controlled by the diffraction grating becomes the desired amount of light. The mark is formed at a position on the optical element main body allowing identification from an optical axis direction.

In the second aspect of the invention, when the rotation and adjustment is performed, an operator or adjustment equipment can form the mark at an easily identifiable position. As a result, quick and highly accurate rotation and adjustment can be performed, and the manufacturing efficiency can be further enhanced.

An optical element according to a third aspect is the optical element according to the second aspect, wherein, the optical element is an optical module holder. In the optical module holder, an optical transmission line attaching section to which an end of an optical transmission line is attached is formed on one side of the diffraction grating in the optical axis direction. A photonic element fixing section that fixes the photonic element after rotation and adjustment has been performed is formed on the other side of the diffraction grating in the optical axis direction. A lens surface is formed between the diffraction grating and the photonic element fixing section.

In the third aspect of the invention, the amount of transmitted light from the diffraction grating can be controlled through use of the polarization-dependent characteristics of the diffraction grating having a simple structure. In addition, when at least one of either an optical element or a photonic element is rotated and adjusted to a position at which the amount of transmitted light is the desired amount of light, the rotation and adjustment can be easily and quickly performed through use of the mark. As a result, costs can be reduced, and the manufacturing efficiency of the optical module holder can be enhanced.

An optical element according to a fourth aspect is the optical element according to any one of the first to third aspects, wherein, a duty ratio of the diffraction grating is equal to or more than 0.1 and equal to or less than 0.25.

In the fourth aspect of the invention, the duty ratio of the diffraction grating can be that in which a transmittance fluctuation range increases. Transmittance fluctuation accompanies changes in an angle of a grating groove direction to a direction of linearly polarized light. The duty ratio can also be that in which temperature dependence of the transmittance decreases. As a result, transmittance of various values can be selected, and stable optical characteristics can be achieved regardless of the temperature variations.

An optical element according to a fifth aspect is the optical element according to any one of the first to fourth aspects, wherein, the diffraction grating is a light-transmitting diffraction grating that outputs incident light by transmission. The diffraction grating and the mark are formed from the same resin material.

In the fifth aspect of the invention, the amount of transmitted light from the diffraction grating can be controlled through use of the polarization-dependent characteristics of the diffraction grating having a simple structure. In addition, when at least one of either an optical element or a photonic element is rotated and adjusted to a position at which the amount of transmitted light is the desired amount of light, the rotation and adjustment can be easily and quickly performed through use of the mark. As a result, the manufacturing efficiency of an optical product using the diffraction grating having a light amount adjustment function can be enhanced, and costs can be reduced. Furthermore, the entire optical element can be integrally formed using the same resin material, thereby further reducing costs.

An optical element according to a sixth aspect is the optical element according to any one of the first to fifth aspects, wherein, the diffraction grating is formed to allow individual control of the amount of outgoing light regarding a plurality of lights having differing wavelengths.

In the sixth aspect of the invention, the diffraction grating can handle the control of the amount of outgoing light regarding a plurality of lights having differing wavelengths. Therefore, design flexibility can be further enhanced.

An optical module according to a seventh aspect comprises the optical element according to any one of the first to sixth aspects and a photonic element.

In the seventh aspect of the invention, the optical module can be cheaply and efficiently manufactured.

An optical connector according to an eighth aspect comprises the optical module according to the seventh aspect and a housing that stores the optical module.

In the eighth aspect of the invention, the optical connector can be cheaply and efficiently manufactured.

An optical module manufacturing method according to a ninth aspect of the invention wherein, when an optical module is manufactured by a photonic element that performs at least one of either light emission or light reception being fixed onto an optical module holder, the photonic element is fixed onto the optical module holder after at least one of either the optical module holder or the photonic element is rotated and adjusted so that an amount of outgoing light controlled by a diffraction grating is a desired amount, while a direction indicated by a mark is confirmed. The optical module holder includes the diffraction grating and the mark. The diffraction grating has a period structure formed from a plurality of grating grooves and is formed to allow control of the amount of outgoing light using polarization-dependent characteristics when the incident light is outputted as the outgoing light. The mark indicates at least one of either a grating groove direction of the diffraction grating or a period direction of the diffraction grating.

In the ninth aspect of the invention, the amount of transmitted light from the diffraction grating can be controlled through the use of the polarization-dependent characteristics of the diffraction grating having a simple structure. In addition, when at least one of either an optical element or a photonic element is rotated and adjusted to a position at which the amount of transmitted light from the diffraction grating is the desired amount of light, the rotation and adjustment can be easily and quickly performed through use of the mark. As a result, the manufacturing cost of the optical module can be reduced, and the manufacturing efficiency of the optical module can be enhanced.

EFFECT OF THE INVENTION

In the invention, the amount of outgoing light can be quickly and very accurately controlled to a desired amount, when incident light is outputted. Costs can be reduced, and manufacturing efficiency can be enhanced. For example, the invention is suitable for inexpensive and efficient manufacture of an optical module holder, an optical module including the optical module holder, and an optical connector.

DETAILED DESCRIPTION OF THE PREFERRED EMBODIMENT

Embodiments of the present invention will be described with reference to FIG. 1 to FIG. 17.

Figure 1:
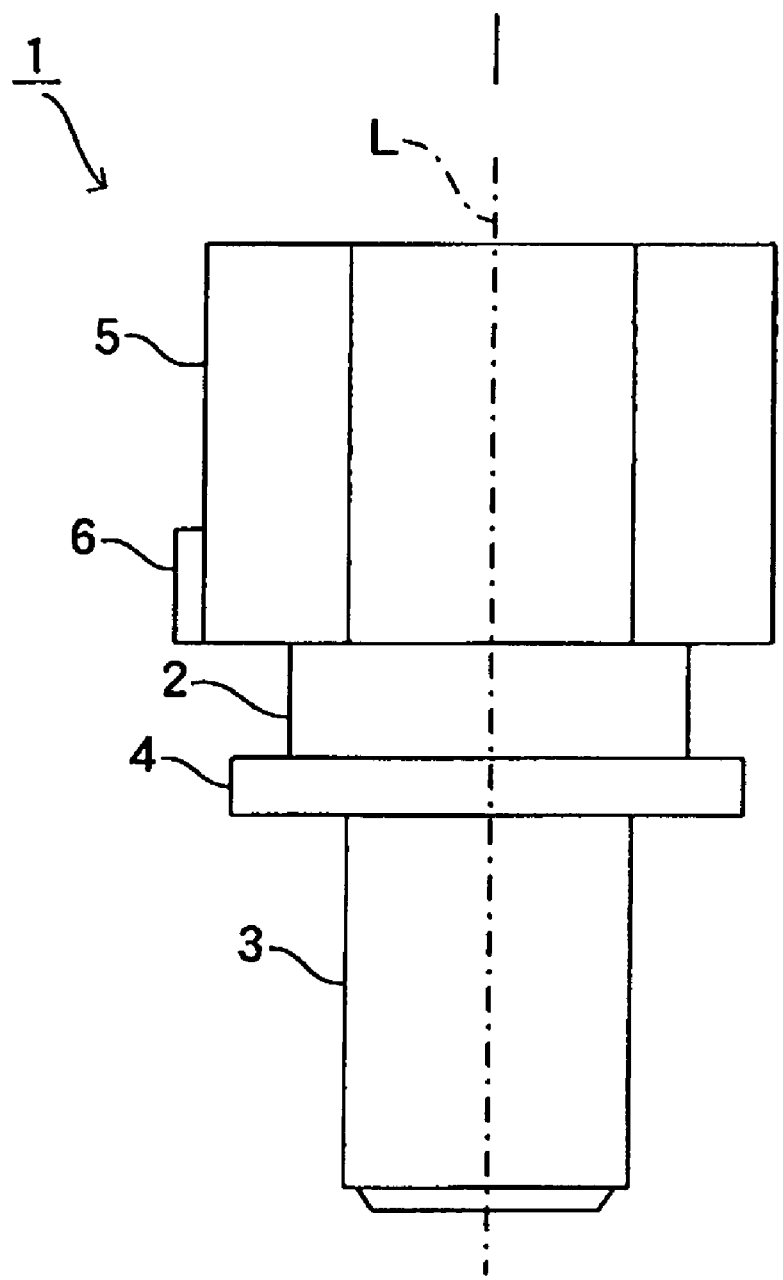
FIG. 1 is a front view of an optical module holder in an optical element according to an embodiment of the present invention.
Figure 2:
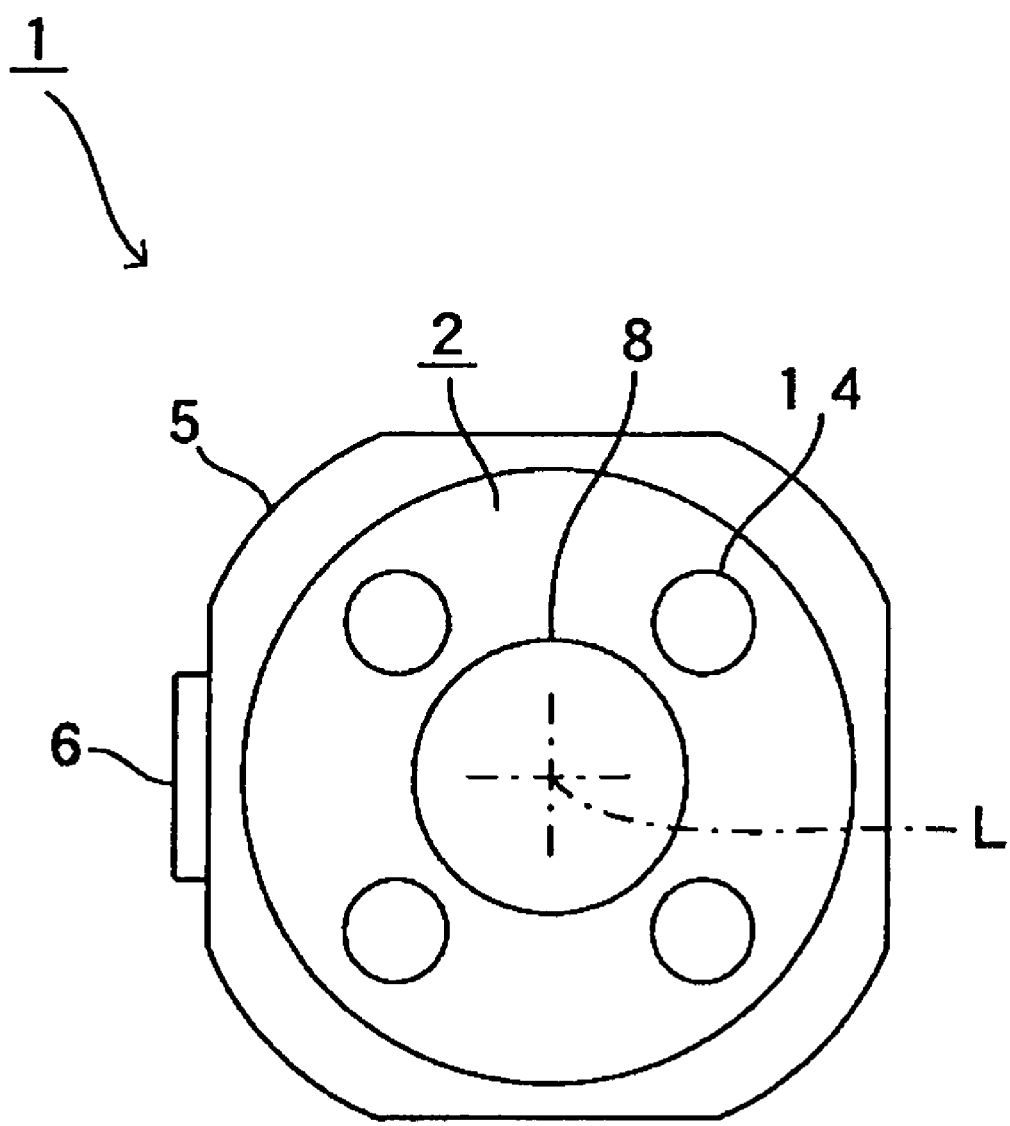
FIG. 2 is a planar view of FIG. 1.
Figure 3:
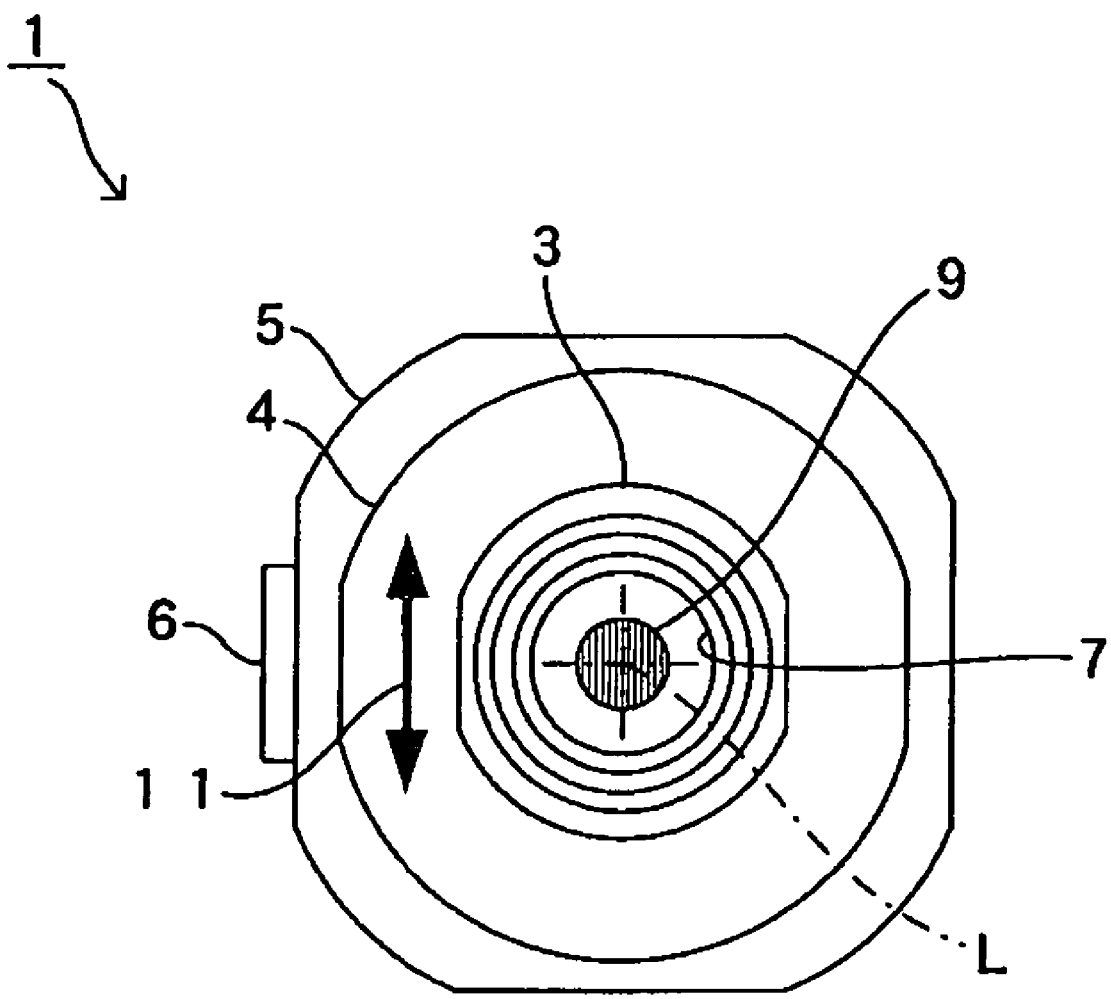
FIG. 3 is a bottom view of FIG. 1 and a diagram of an example of a mark.
Figure 4:
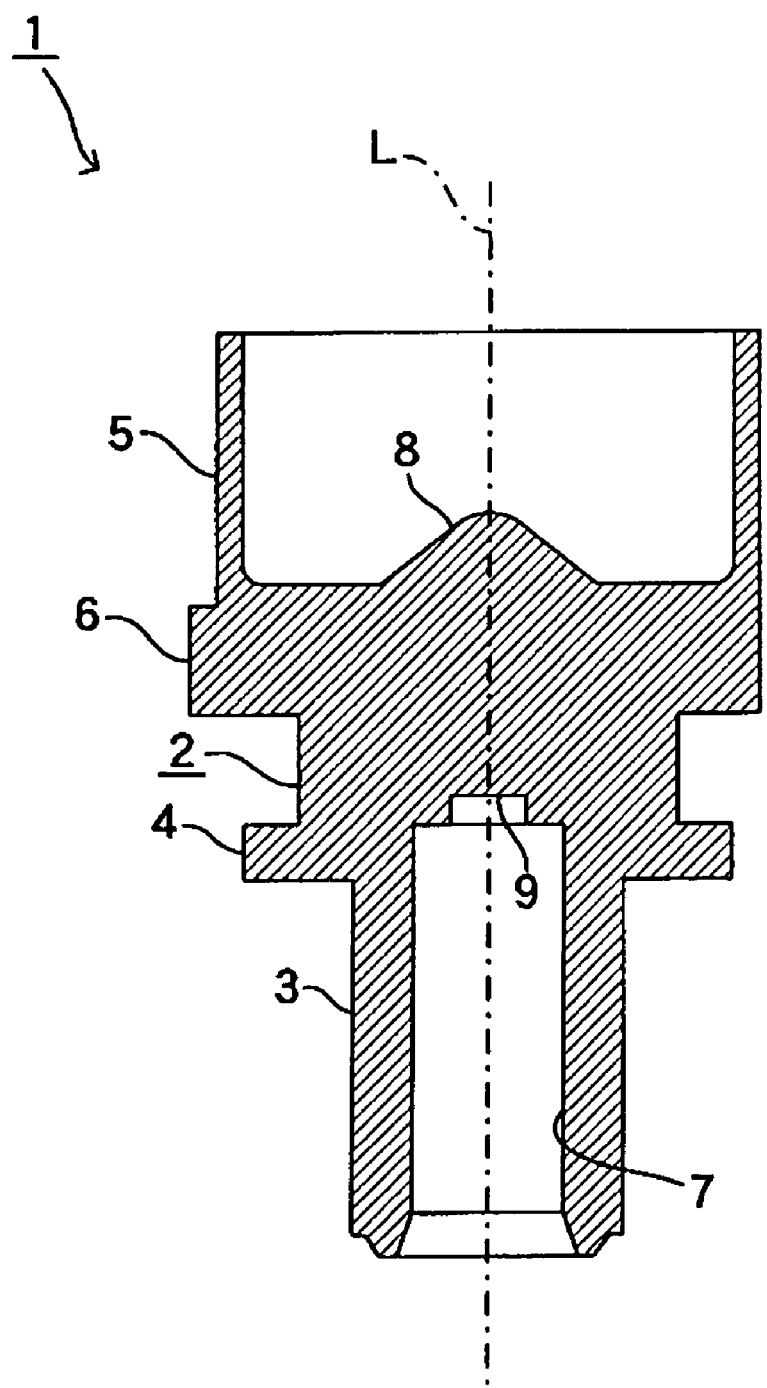
FIG. 4 is a cross-sectional diagram of the optical module holder.

FIG. 1 is a front view of an optical module holder 1 that is an example of an optical element according to an embodiment of the invention. FIG. 2 is a planar view of FIG. 1. FIG. 3 is a bottom view of FIG. 1. FIG. 4 is a cross-sectional view of FIG. 1.

The optical module holder 1 according to the embodiment is integrally formed by resin material being injection-molded. The resin material is made from light-transmitting plastic, such as polyetherimide (PEI), polycarbonate (PC), and polymethylmethacrylate (PMMA).

As shown in FIG. 1 to FIG. 4, the optical module holder 1 according to the embodiment has a disk-shaped optical function section 2. An optical fiber attaching section 3 serving as an optical transmission line attaching section is formed on one side of the optical function section 2 in an optical axis L direction (lower area in FIG. 1 and FIG. 4). A photoelectric conversion element attaching section 5 serving as a photonic element fixing section is formed on the other side in the optical axis L direction (upper area in FIG. 1 and FIG. 4).

The optical fiber attaching section 3 is formed into a cylinder having an optical fiber attaching hole 7 in the center. An end of an optical fiber serving as the optical transmission line can be attached, in addition to a ferrule, to the optical fiber attaching section 3, via the optical fiber attaching hole 7 (not shown).

The photoelectric conversion element attaching section 5 is formed into a cylinder having a larger diameter than the optical fiber attaching section 3. A photoelectric conversion element serving as a photonic element having a light-emitting element, such as a laser light source, is fixed onto the photoelectric conversion element attaching section 5.

On the outer peripheral surface of the photoelectric conversion element attaching section 5, a section cast within a mold gate (referred to, hereinafter, as a cast-within-gate section 6) is formed so as to protrude.

Furthermore, a ring-shaped flange section 4 is formed on the outer periphery of the edge of the optical fiber attaching section 3 on the optical function section 2 side.

A lens surface 8 (a convex lens surface in FIG. 4) is formed on the surface of the optical function section 2 on the photoelectric conversion element attaching section 5 side. A diffraction grating 9 is formed n the surface of the optical function section 2 on the optical fiber attaching section 3 side.

Figure 5:
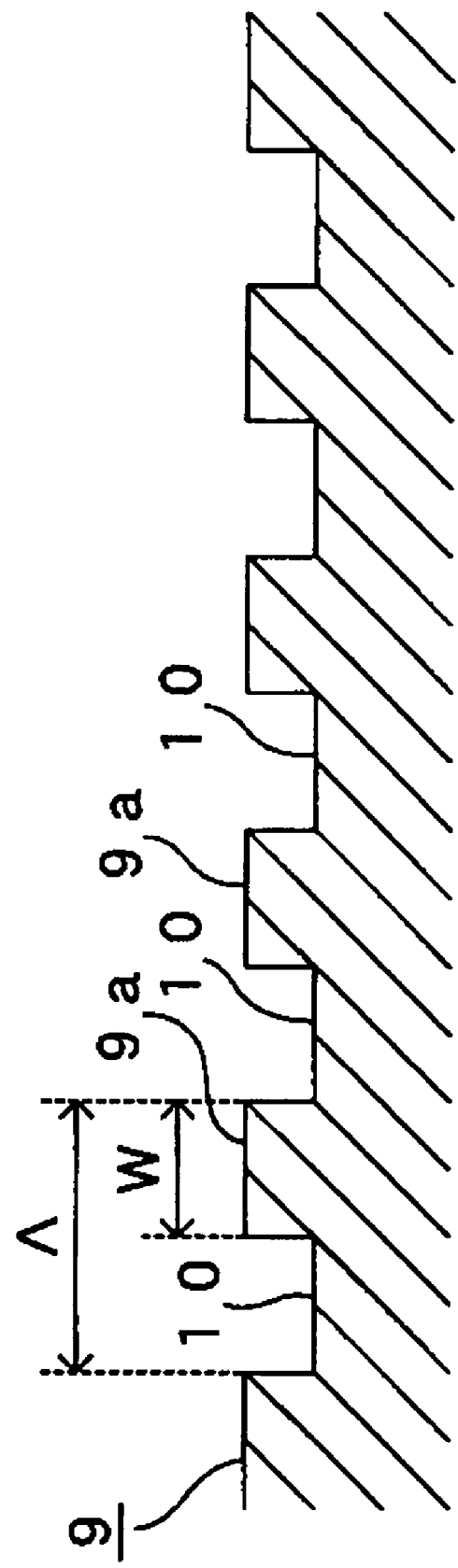
FIG. 5 is an enlarged view of a diffraction grating in the optical element according to the embodiment of the invention.
Figure 6:
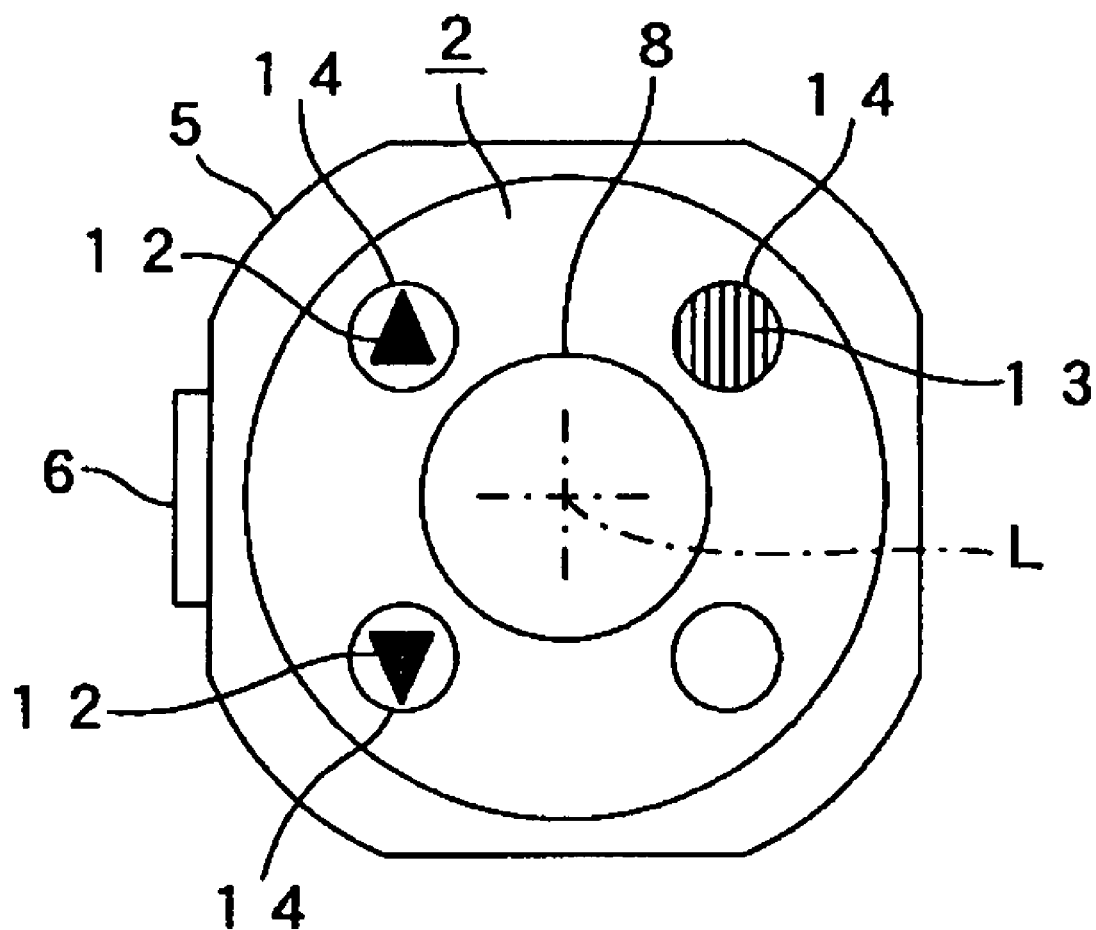
FIG. 6 is a diagram of a first variation example of the mark shown in FIG. 3 in the optical element according to the embodiment of the invention.
Figure 7:
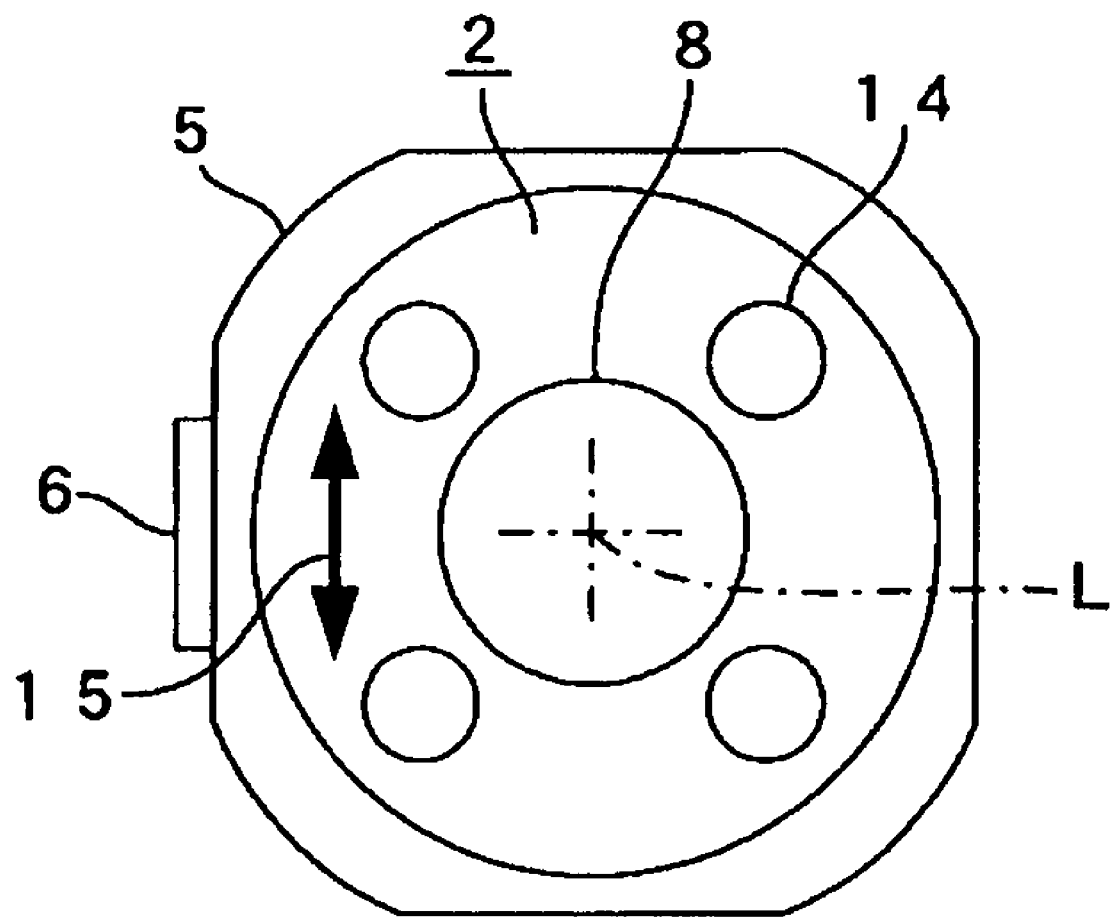
FIG. 7 is a diagram of a second variation example of the mark shown in FIG. 3 in the optical element according to the embodiment of the invention.
Figure 8:
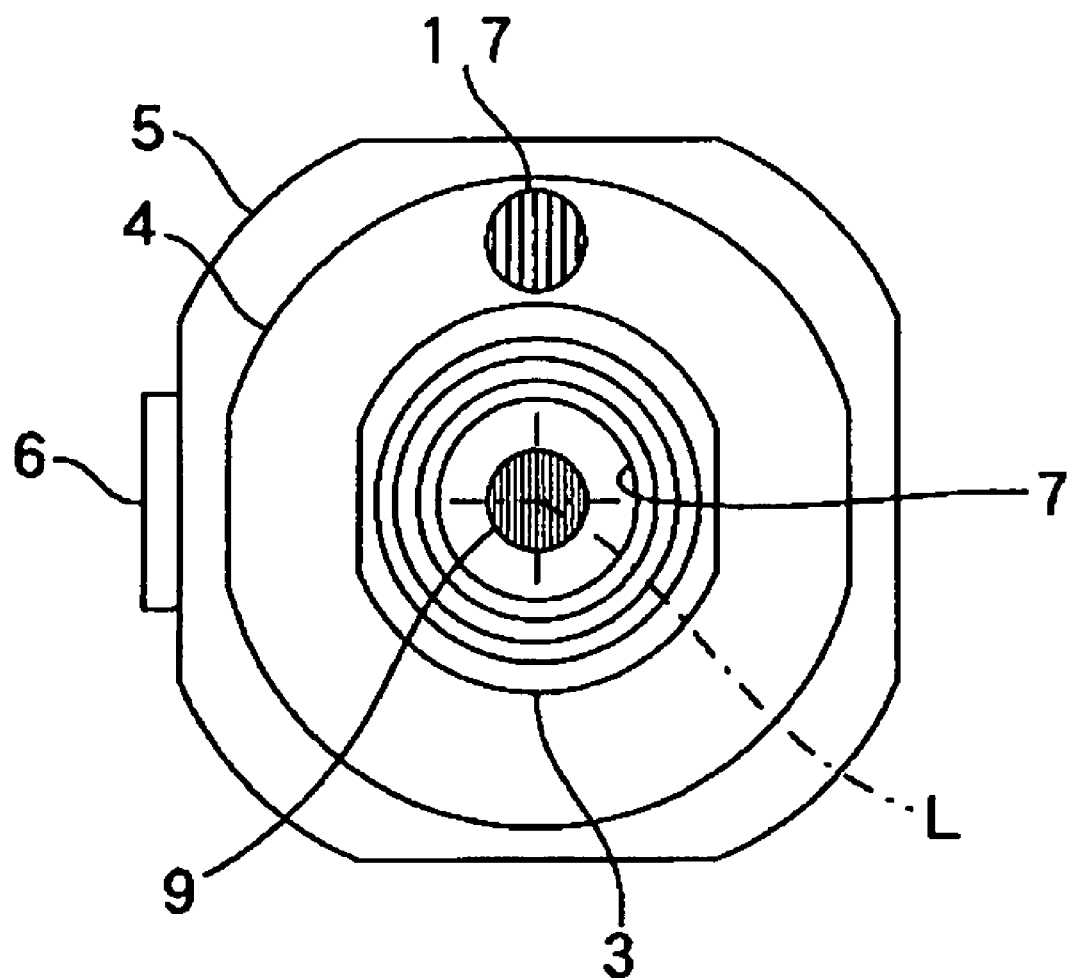
FIG. 8 is a diagram of a third variation example of the mark shown in FIG. 3 in the optical element according to the embodiment of the invention.

As shown in FIG. 5, the diffraction grating 9 has a periodic structure formed from a plurality of grating grooves 10. A period Λ of the diffraction grating is formed to be smaller than the wavelength of the light to be used. As a result, the diffraction grating 9 can exert polarization-dependent characteristics through a simple structure.

In other words, when linearly polarized light incident from the optical axis L direction is outputted as transmitted light that is the outgoing light, the diffraction grating 9 can exert a characteristic in that the amount of transmitted light or, in other words, transmittance can be controlled to a transmittance depending on an angle of a grating groove 10 direction to a direction of the linearly polarized light incident on the diffraction grating 9.

When the photoelectric conversion element is fixed onto the photoelectric conversion element attaching section 5, the optical module holder 1 according to the embodiment is rotated around the optical axis L and adjusted to at a position at which the transmittance in the diffraction grating 9 of the linearly polarized light incident onto the diffraction grating 9, emitted from the light-emitting element of the photoelectric conversion element, becomes a desired transmittance. The photoelectric conversion element is fixed onto the photoelectric conversion element attaching section 5 at the position at which the rotation and adjustment is completed. As an indicator used in the rotation and adjustment such as this, according to the embodiment, a mark 11 is formed on the surface of the flange section 4 on the optical fiber attaching section 3 side, as shown in FIG. 3. The mark 11 indicates the grating groove 10 direction of the diffraction grating 9 (namely, the length direction of the grating groove 10), using an arrow.

Here, when the rotation and adjustment is performed, after the direction of the linearly polarized light from the light-emitting element of the photoelectric conversion element and the angle (referred to, hereafter, as a target angle) of the grating groove 10 direction to the direction of the linearly polarized light when the desired transmittance can be obtained in the diffraction grating 9 are grasped beforehand, the optical module holder 11 is rotated around the optical axis L to a position at which the angle of the direction indicated by the mark 11 to the direction of the linearly polarized light reaches the target angle, while the direction indicated by the mark 11 is visually confirmed. As a result, the diffraction grating 9 can achieve a desired transmittance at the position after the rotation and adjustment is completed. At this time, precise rotation and adjustment can be performed, after the position of the optical module holder 1 to the photoelectric conversion element becomes a position in the rotation direction at which the approximate target angle can be formed, through the use of the mark 11. Therefore, precise rotation and adjustment amount is small.

As a result, according to the embodiment, the rotation and adjustment can be easily and quickly performed through the use of the mark 11.

Furthermore, as shown in FIG. 3, as a result of the mark 11 being formed at a position at which confirmation from the optical axis L direction can be facilitated during the rotation and adjustment, the rotation and adjustment can be more easily performed.

The mark used for the rotation and adjustment is not limited to that shown in FIG. 3. For example, as in a first variation example shown in FIG. 6, a mark 12 indicating the grating groove 10 direction using an arrow or a mark 13 indicating the grating groove 10 direction using a stripe pattern running along the grating groove 10 direction can be formed on the bottom of a reentrant mark 14 that is formed by an ejector pin so as to cave inwards at a position on the outer side of the lens surface 8 in the optical function section 2. Furthermore, as in the second variation example shown in FIG. 7, a mark 15 indicating the grating groove 10 direction using an arrow can be formed at a position on the outer side of the lens surface 8 in the optical function section 2, excluding than the reentrant mark 14. Still further, as shown in a third variation example shown in FIG. 8, a mark 17 indicating the grating groove 10 direction using a stripe pattern can be formed on the surface of the flange section 4 on the optical fiber attaching section 3 side. The mark 11 shown in FIG. 3 and the marks 12, 13, 15, and 17 shown in the first to third variation examples can also be combined accordingly.

In addition, a mark indicating the period direction of the diffraction grating 9 (in other words, the period direction of the grating groove 10) can be formed in place of the above-described marks 11, 12, 13, 15, and 17, or with any of the marks 11, 12, 13, 15, and 17. In this case, as well, the rotation and adjustment can be easily and quickly performed, as when the mark indicating the grating groove 10 direction is used.

Instead of the optical module holder 1 or with the optical module holder 1, the photoelectric conversion element can be rotated around the optical axis L and adjusted. It goes without saying that the rotation and adjustment can involve not only the rotation in one direction of the optical axis L revolution direction, but also the rotation in the opposite direction.

In addition to the above-described configuration, according to the embodiment, a duty ratio $W/\Lambda$ of the diffraction grating 9 is equal to or more than 0.1 and equal to or less than 0.25. The duty ratio $W/\Lambda$ of the diffraction grating 9 is a ratio of a measurement W in the period direction of a spacing section between adjacent grating grooves 10 (a flat section $9a$ in FIG. 5) to the period $\Lambda$ of the diffraction grating 9.

Figure 9:
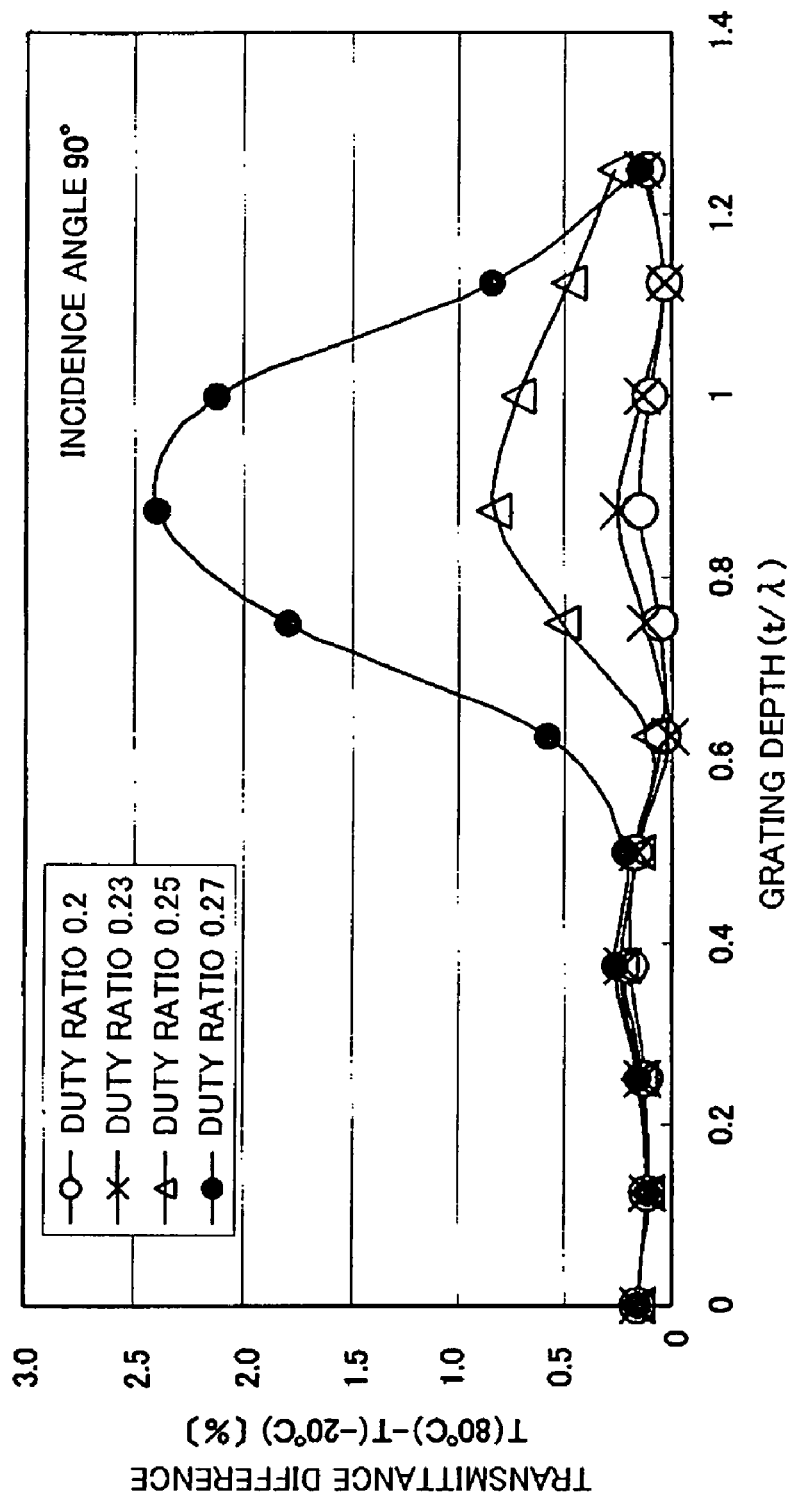
FIG. 9 is a graph showing temperature dependence of transmittance in the diffraction grating when an incidence angle of light is 90° in the optical element according to the embodiment of the invention.

Here, FIG. 9 is a graph showing temperature dependence of the transmittance of the diffraction grating 9 when a laser beam including a linearly polarized light having a wavelength of 0.85 μm is incident on the diffraction grating 9 of which the refractive index n is 1.64, the dn/dT is $-1.1 \times 10^{-4}[/^\circ C.]$ (here, T indicates the temperature), and the period $\Lambda$ is 0.8 μm. The angle of the laser beam to the grating groove 10 direction is 90° (incidence angle in FIG. 10). A horizontal axis in FIG. 9 indicates a corresponding value (referred to, hereinafter, as grating depth $[t/\lambda]$) that is the depth $t[\mu m]$ of the grating groove 10 divided by the wavelength $\lambda=0.85[\mu m]$ being used. A vertical axis in FIG. 9 indicates a difference (transmittance difference) between the transmittance at a temperature of 80° and the transmittance at a temperature of 20°.

As shown in FIG. 9, when the duty ratio is equal to or less than 0.25, the transmittance difference can be kept low regardless of the grating depth.

Figure 11:
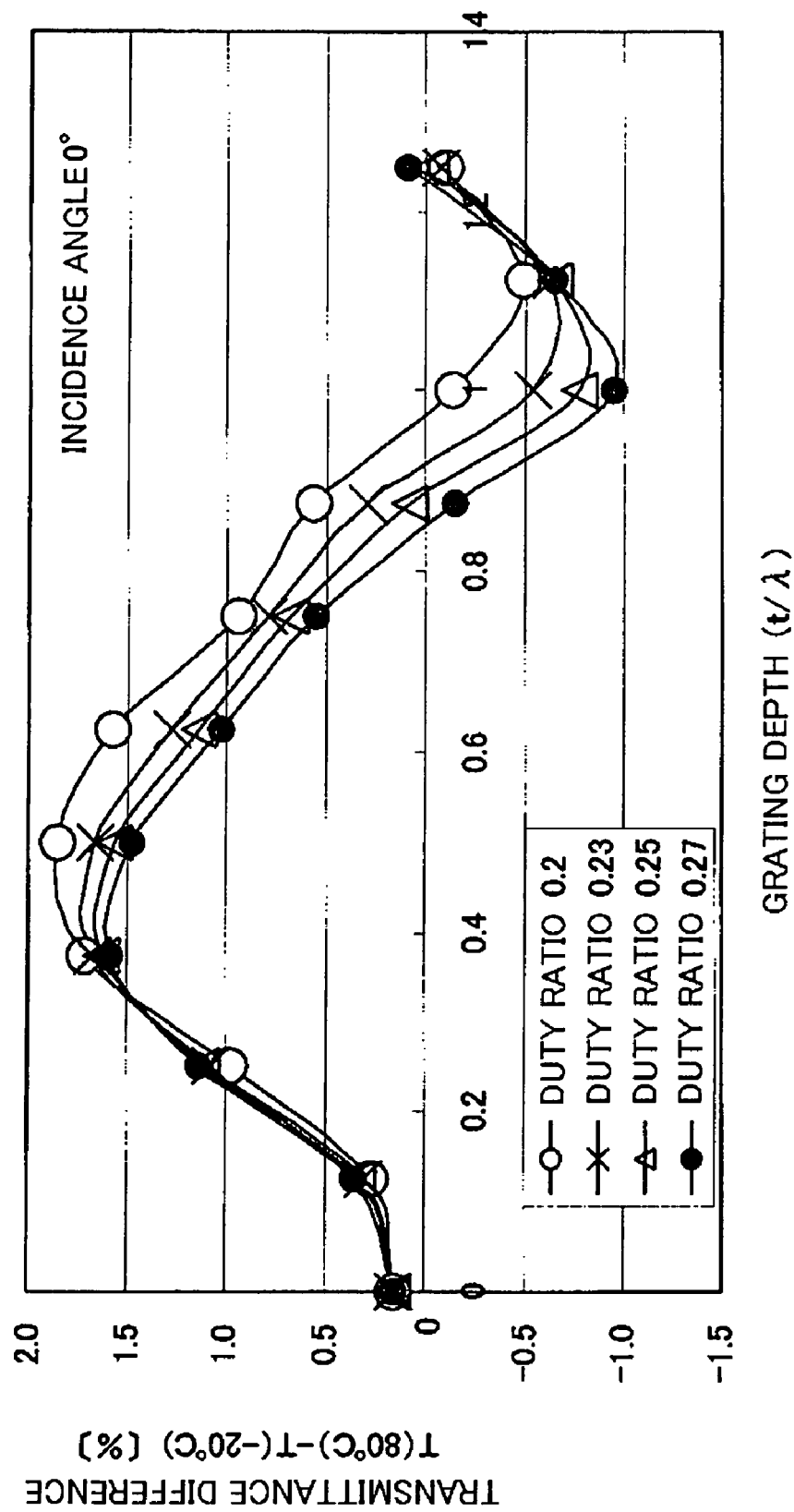
FIG. 11 is a graph showing temperature dependence of transmittance in the diffraction grating when the incidence angle of the light is 0° in the optical element according to the embodiment of the invention.
Figure 12:
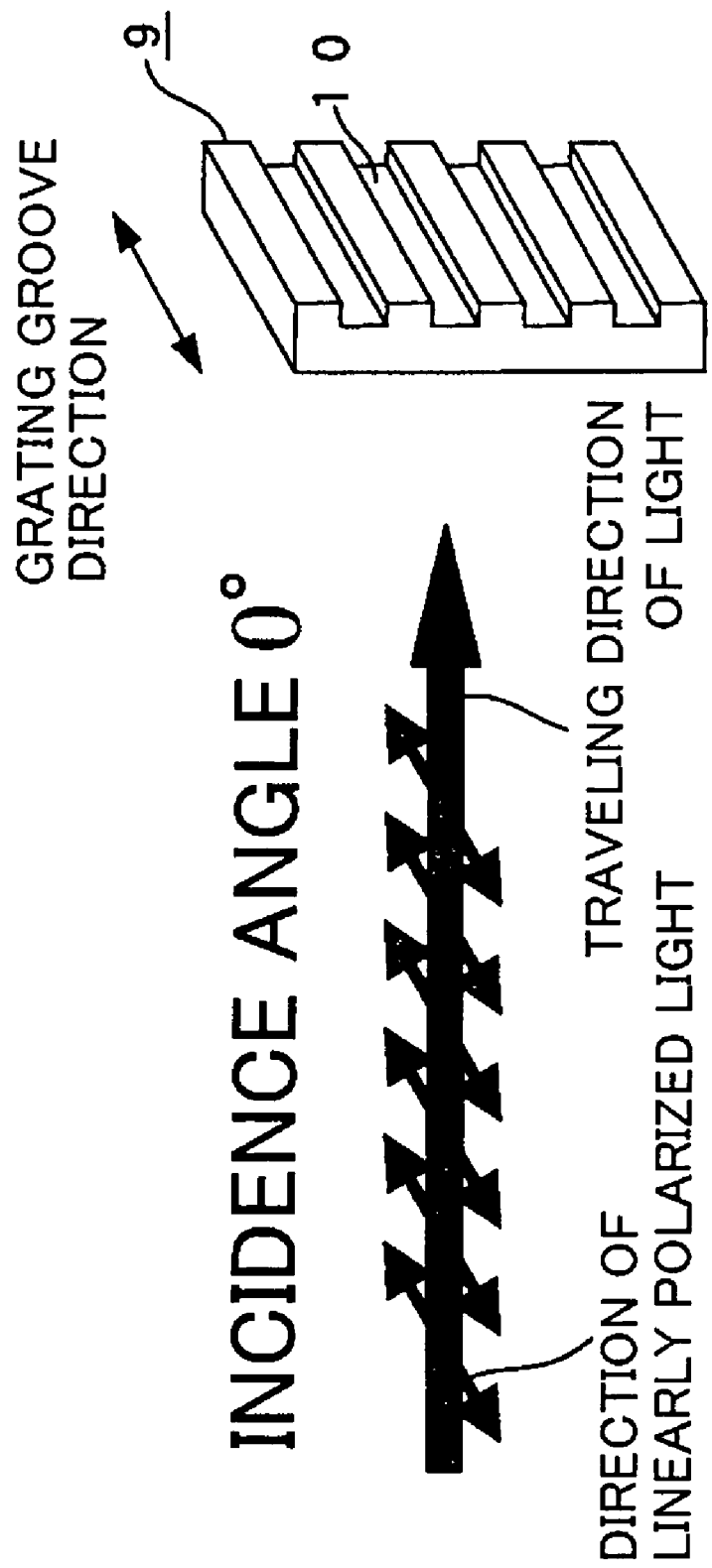
FIG. 12 is an explanatory diagram of a state in which the incidence angle of the light is 0° in the optical element according to the embodiment of the invention.

FIG. 11 is a graph showing the temperature dependence of the transmittance of the diffraction grating 9 when a laser beam including a linearly polarized light having a wavelength of 0.85 μm is incident on the diffraction grating 9 of which the period $\Lambda$ is 0.8 μm. The angle of the laser beam to the grating groove 10 direction is 0° (incidence angle in FIG. 12). The horizontal axis and the vertical axis in FIG. 11 are the same as those in FIG. 9.

As shown in FIG. 11, when the angle of the grating groove 10 direction to the direction of the linearly polarized light is 0° (refer to FIG. 12), it is difficult to clearly set a threshold of the duty ratio suitable for reduction of the temperature dependence of the transmittance. However, using FIG. 11, a combination of the duty ratio and the grating depth allowing a reduction in the temperature dependence of the transmittance can be selected. For example, when a diffraction grating 9 having a duty ratio of 0.2 is designed, the grating depth $[t/\lambda]=1$ is preferably selected.

Figure 10:
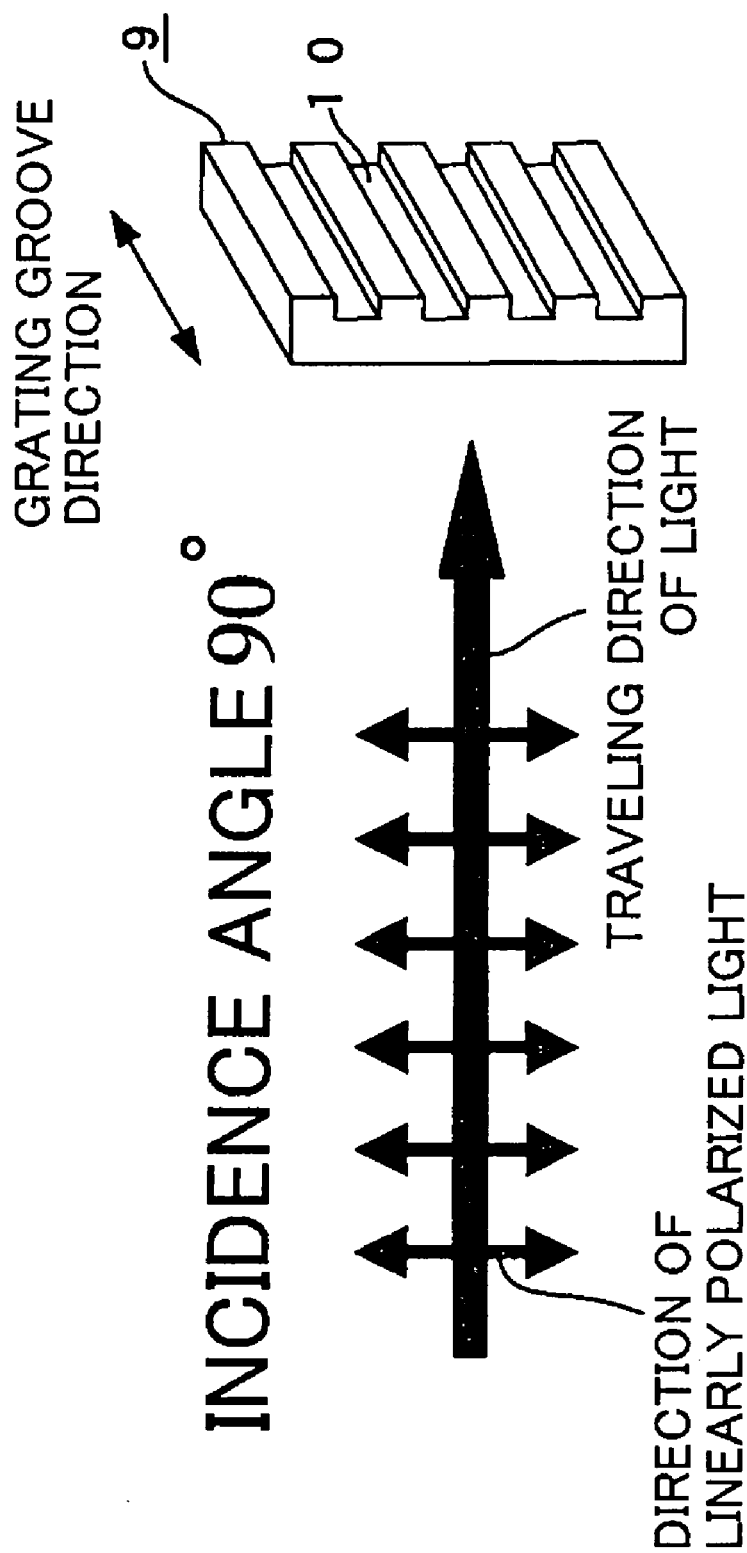
FIG. 10 is an explanatory diagram of a state in which the incidence angle of the light is 90° in the optical element according to the embodiment of the invention.
Figure 13:
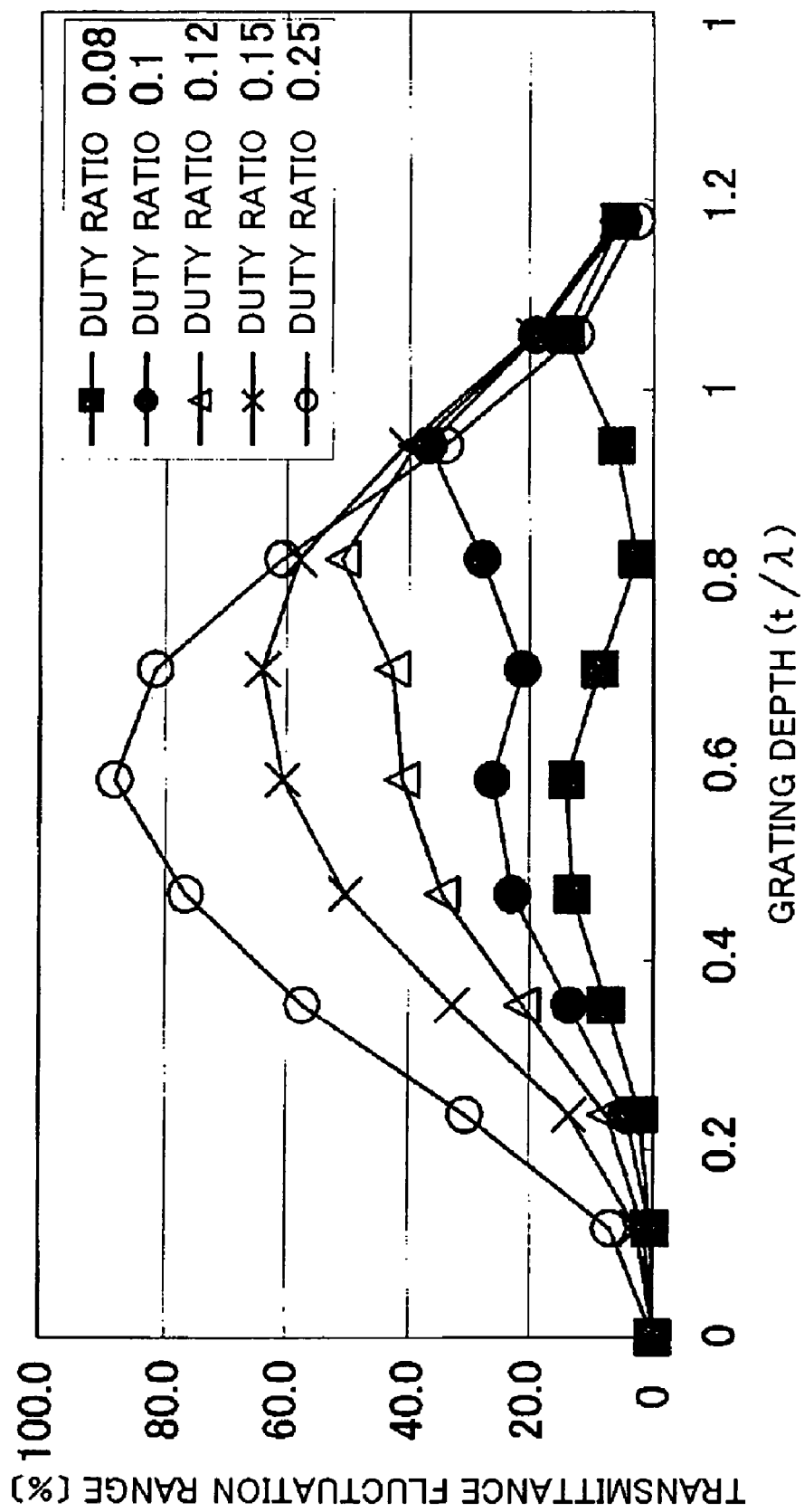
FIG. 13 is a graph showing characteristics of a transmittance fluctuation range of the diffraction grating in the optical element according to the embodiment of the invention.

Furthermore, FIG. 13 is a graph showing a transmittance fluctuation range of the diffraction grating 9, when the diffraction grating 9 is rotated around the optical axis so that, when the laser light including the linearly polarized light having a wavelength of 0.85 μm is incident on the diffraction grating 9 of which the period $\Lambda$ is 0.8 μm, the angle of the grating groove 10 direction to the direction of the linearly polarized light changes from 0° (refer to FIG. 12) to 90° (refer to FIG. 10). The horizontal axis in FIG. 13 indicates the grating depth $[t/\lambda]$. The vertical axis indicates the transmittance fluctuation range of the diffraction grating 9.

As shown in FIG. 13, it is clear that, when the duty ratio is equal to or more than 0.1, the transmission fluctuation range can be widened.

Therefore, as according to the embodiment, the transmission fluctuation range accompanying the change in the angle of the grating groove 10 direction to the direction of the linearly polarized light can be widened by the duty ratio being made equal to or more than 0.1 and equal to or less than 0.25. Furthermore, the temperature dependence of the transmittance when the angle of the grating groove direction to the linearly polarized light is 90° can be reduced. As a result, design flexibility can be increased because transmittance of various values can be selected. Furthermore, stable optical characteristics can be achieved regardless of temperature variations.

Figure 16:
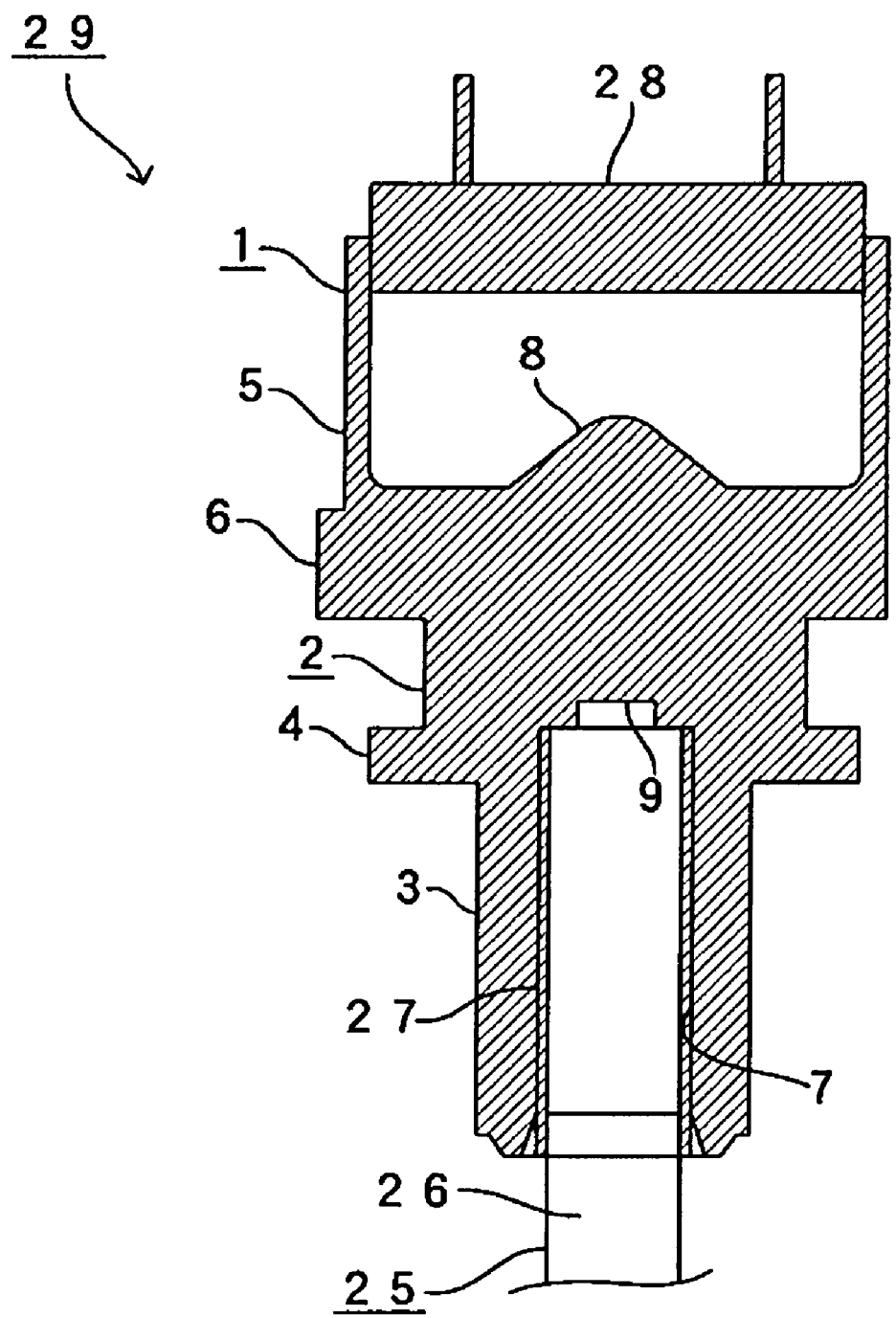
FIG. 16 is a cross-sectional view of an optical module according to an embodiment of the invention.
Figure 17:
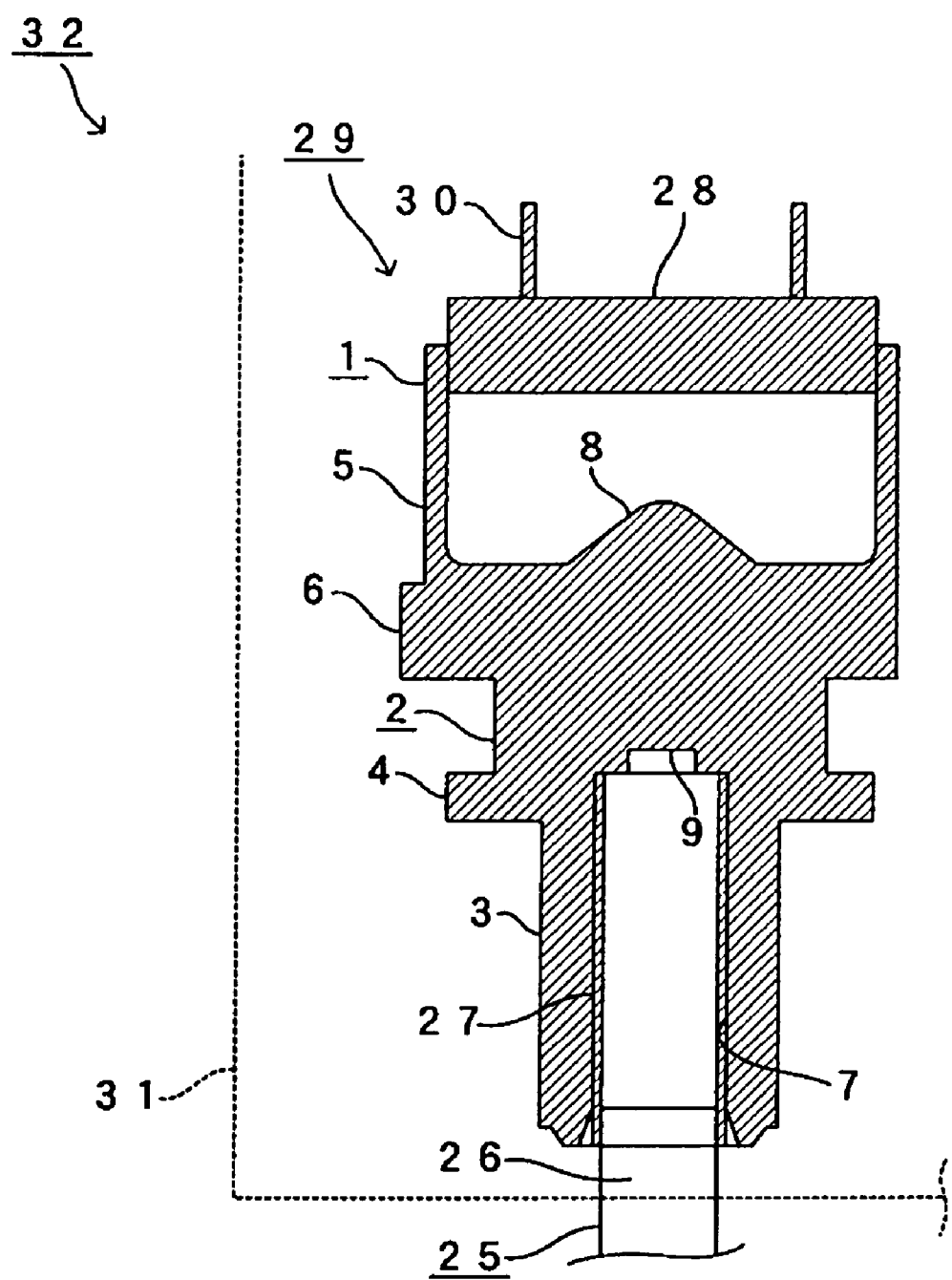
FIG. 17 is a schematic diagram of an optical connector according to an embodiment of the invention.

In the optical module holder 1 having a configuration such as this, as shown in FIG. 16, an optical module 29 is formed by the photoelectric conversion element 28 being fixed onto the photoelectric conversion element attaching section 5, after the above-described rotation and adjustment is performed. An end of the optical fiber 25 is attached, in addition to a ferrule 27 holding a fiber core 29, to the optical fiber attaching section 3 in the optical module 29. Furthermore, as shown in FIG. 17, the optical module 29 is stored within a housing 31. A lead terminal 30 of the photoelectric conversion element 28 is connected to an electrical board (not shown) within the housing, thereby forming an optical connector 32.

As described above, according to the embodiment, the transmittance of the diffraction grating 9 can be controlled with high accuracy through the use of the polarization-dependent characteristics of the diffraction grating 9 having a simple structure. In addition, when the optical module holder 1 is rotated and adjusted to a position at which the transmittance becomes a desired value, the rotation and adjustment can be easily and quickly performed through use of the marks 11, 12, 13, 15, and 17. As a result, costs can be reduced, and the manufacturing efficiency of the optical module holder 1, the optical module including the optical module holder 1, and the optical connector can be improved.

The present invention is not limited to the above-described embodiment. Various modifications can be made as required.

For example, the photoelectric conversion element can include a light-receiving element in addition to the light-emitting element. The period $\Lambda$ of the diffraction grating 9 can be that in a resonance region ($\Lambda$ to wavelength to be used). Furthermore, the cast-within-gate section 6 can be used as the mark for rotation and adjustment. In this case, in the mark, the direction in which the cast-within-gate section 6 protrudes is indicating at least one of either the grating groove 10 direction of the diffraction grating 9 or the period direction of the diffraction grating 9.

Figure 14:
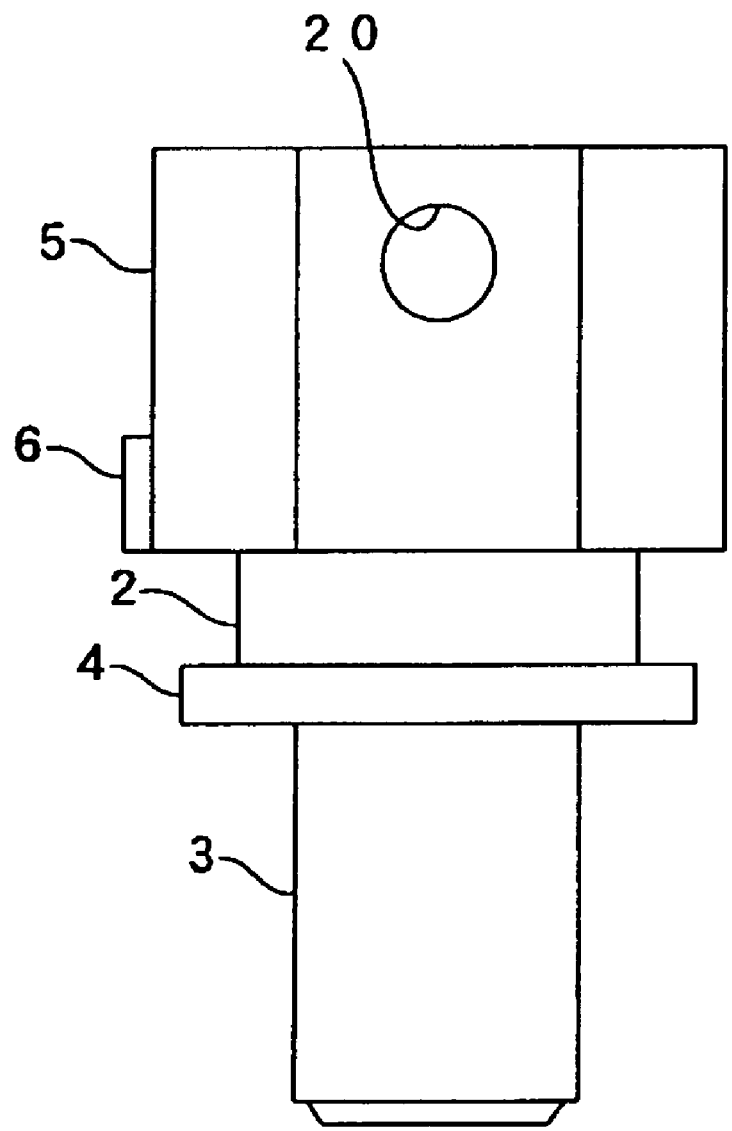
FIG. 14 is a front view of a fourth variation example of the mark shown in FIG. 3 in the optical element according to the embodiment of the invention.
Figure 15:
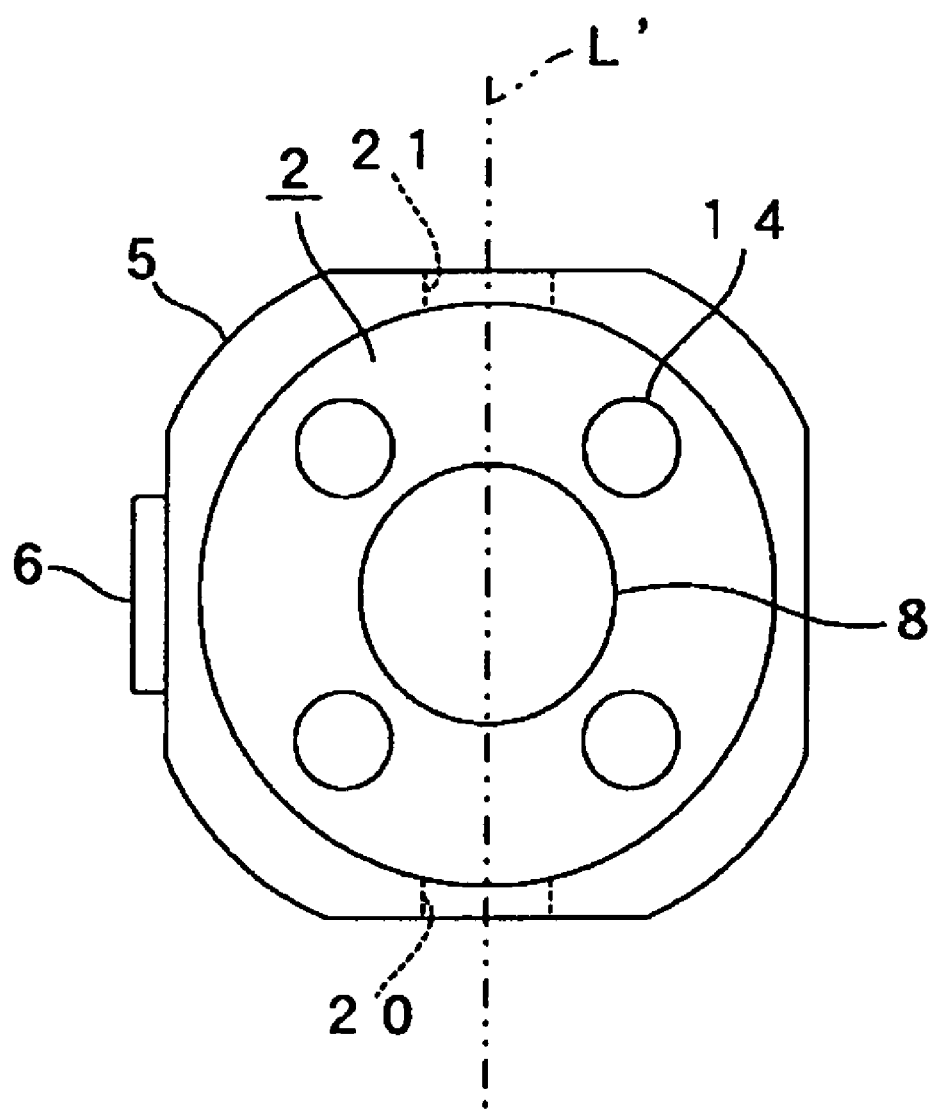
FIG. 15 is a planar view of FIG. 14.

In addition, for example, as shown in FIG. 14 and FIG. 15 (fourth variation example), a pair of through-holes 20 and 21 are formed in the photoelectric conversion attaching section 5 in a radial direction of the lens surface 8, at a position opposing one another. The through-holes 20 and 21 can be used as marks in which a virtual line L' connecting the through-holes 20 and 21 indicates the grating groove 10 direction or the period direction. As the photonic element, in place of the light-emitting element or in addition to the light-emitting element, a light-receiving element that receives light can be fixed onto the optical module holder 1.

Still further, the invention can be applied to an optical element other than the optical module holder, such as a diffraction element mounted on an optical pickup device.

What is claimed is:

1. An optical element comprising:
    a diffraction grating having a periodic structure made from a plurality of grating grooves and formed to allow control of an amount of outgoing light using polarization-dependent characteristics when incident light is outputted as the outgoing light; and
    a mark indicating at least one of either a grating groove direction of the diffraction grating or a periodic direction of the diffraction grating; and wherein
    a photonic element that can perform at least one of either light emission or light reception can be fixed and, when the photonic element is fixed, the optical element is formed to be fixed to the photonic element after at least one of either an optical element main body or the photonic element is rotated around an optical axis and adjusted so that the amount of outgoing light controlled by the diffraction grating becomes a desired amount of light; and
    the mark is formed at a position on the optical element main body allowing identification from an optical axis direction.

2. The optical element according to claim 1, wherein:
    the optical element is an optical module holder in which an optical transmission line attaching section to which an end of an optical transmission line is attached is formed on one side of the diffraction grating in the optical axis direction, a photonic element fixing section that fixes the photonic element after rotation and adjustment is performed is formed on another side of the diffraction grating in the optical axis direction, and a lens surface is formed between the diffraction grating and the photonic element fixing section.

3. An optical module comprising the optical element according to claim 1 and a photonic element.

4. An optical connector comprising the optical module according to claim 3 and a housing that stores the optical module.

5. The optical element according to claim 1 or 2, wherein:
    a duty ratio of the diffraction grating is equal to or more than 0.1 and equal to or less than 0.25.

6. The optical element according to claim 1 or 2, wherein:
    the diffraction grating is a light-transmitting diffraction grating that outputs incident light by transmission, and the diffraction grating and the mark are formed from a same resin material.

7. The optical element according to claim 1 or 2, wherein the diffraction grating is formed to allow individual control of the amount of outgoing light regarding a plurality of lights having differing wavelengths.

8. An optical module manufacturing method wherein:
    when an optical module is manufactured by a photonic element that performs at least one of either light emission or light reception being fixed onto an optical module holder including a diffraction grating having a period structure formed from a plurality of grating grooves and formed to allow control of an amount of outgoing light using polarization-dependent characteristics when an incident light is outputted as the outgoing light and a mark indicating at least one of either a grating groove direction of the diffraction grating or a period direction of the diffraction grating, the photonic element is fixed onto the optical module holder after at least one of either the optical module holder or the photonic element is rotated and adjusted so that an amount of outgoing light controlled by a diffraction grating is a desired amount, while a direction indicated by the mark is confirmed.

* * * * *